(12) United States Patent
Kim et al.

(10) Patent No.: US 12,327,341 B2
(45) Date of Patent: Jun. 10, 2025

(54) DISPLAY DEVICE

(71) Applicant: LG ELECTRONICS INC., Seoul (KR)

(72) Inventors: Hyomin Kim, Seoul (KR); Kangsoo Kim, Seoul (KR); Jonghyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 614 days.

(21) Appl. No.: 17/596,894

(22) PCT Filed: Jun. 20, 2019

(86) PCT No.: PCT/KR2019/007422
§ 371 (c)(1),
(2) Date: Dec. 20, 2021

(87) PCT Pub. No.: WO2020/256185
PCT Pub. Date: Dec. 24, 2020

(65) Prior Publication Data
US 2022/0318964 A1    Oct. 6, 2022

(51) Int. Cl.
*G06T 5/92*    (2024.01)
*G06T 5/40*    (2006.01)
*G09G 3/20*    (2006.01)

(52) U.S. Cl.
CPC ............ *G06T 5/92* (2024.01); *G06T 5/40* (2013.01); *G09G 3/2007* (2013.01); *G09G 2320/0626* (2013.01)

(58) Field of Classification Search
CPC ..... G06T 5/92; G06T 5/40; G09G 2320/0626; G09G 3/2007
See application file for complete search history.

(56) References Cited

U.S. PATENT DOCUMENTS 10,218,953 B2    2/2019 Yamaguchi
2016/0110854 A1*    4/2016 Kohashi ............... G06V 40/171
382/167

(Continued)

FOREIGN PATENT DOCUMENTS

JP    2009200743    9/2009
JP    2009200743 A  *  9/2009

(Continued)

OTHER PUBLICATIONS

Otsu, Nobuyuki. "A threshold selection method from gray-level histograms." Automatica 11.285-296 (1975): 23-27. (Year: 1975).*

(Continued)

*Primary Examiner* — John Villecco
*Assistant Examiner* — Alexander John Rodgers
(74) *Attorney, Agent, or Firm* — LEE, HONG, DEGERMAN, KANG & WAIMEY

(57) ABSTRACT

The present invention relates to a display device for providing improved dynamic tone mapping, the device comprising: a control unit for performing tone mapping to adjust a luminance of an input image by using a tone curve; and a display unit for displaying an image, the luminance of which has been adjusted by tone mapping, wherein the control unit may calculate a threshold value for separation of an object and a background in the input image, and may change the tone curve on the basis of the threshold value.

17 Claims, 13 Drawing Sheets

(56) References Cited

U.S. PATENT DOCUMENTS

2018/0048875 A1* 2/2018 Park .................... H04N 13/133
2018/0359495 A1* 12/2018 Oh ..................... H04N 21/2362

FOREIGN PATENT DOCUMENTS

| JP | 2010074222      |   | 4/2010 |            |
|----|-----------------|---|--------|------------|
| JP | 2019011972 A    | * | 1/2019 | G06T 7/0006 |
| KR | 1020180018067   |   | 2/2018 |            |
| KR | 20180031154 A   | * | 3/2018 |            |
| KR | 1020180031154   |   | 3/2018 |            |

OTHER PUBLICATIONS

Korean Intellectual Property Office Application No. 10-2021-7036880, Notice of Allowance dated Jul. 26, 2023, 1 pages.
PCT International Application No. PCT/KR2019/007422, International Search Report dated Mar. 17, 2020, 3 pages.

* cited by examiner

FIG. 10
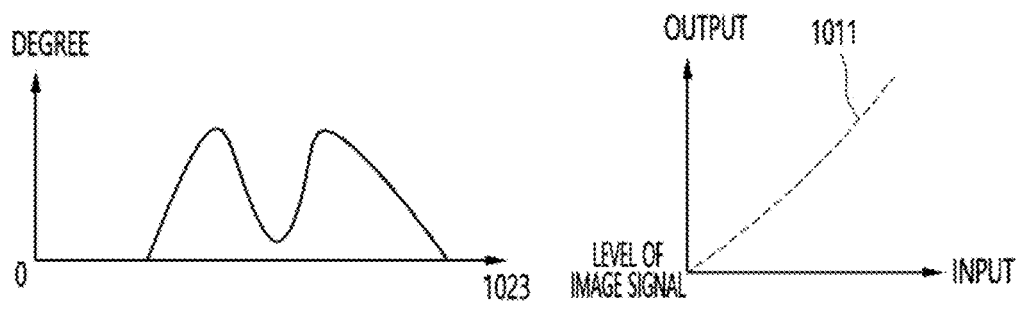
(a)
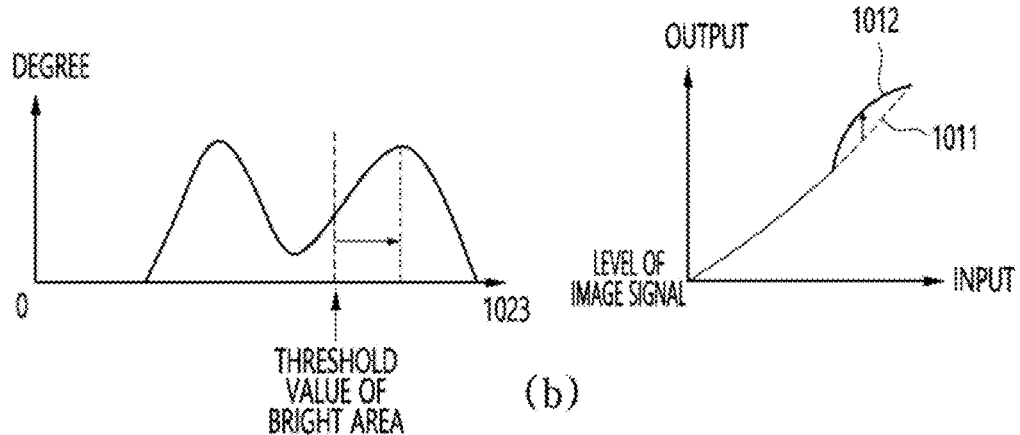
(b)

FIG. 11
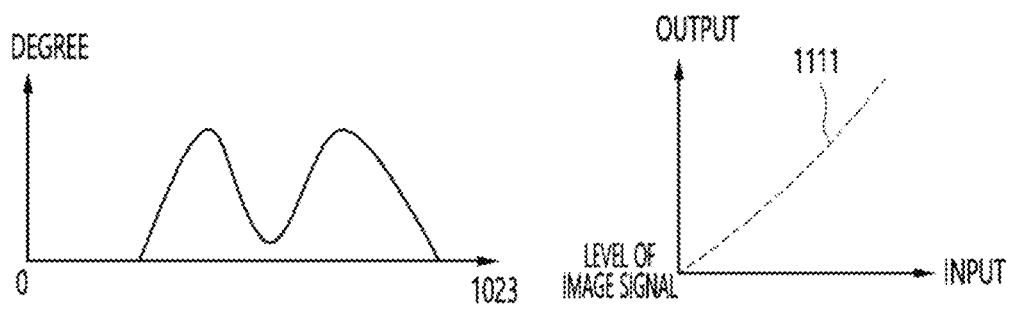
(a)
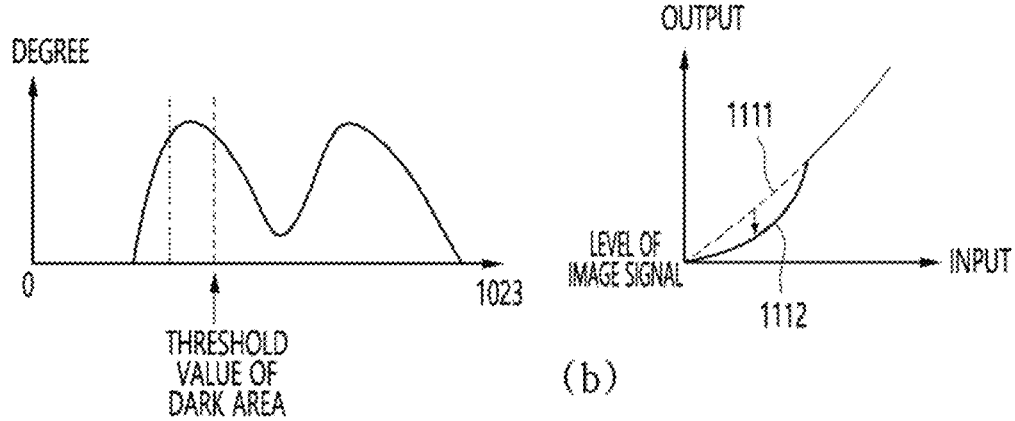
(b)

FIG. 12
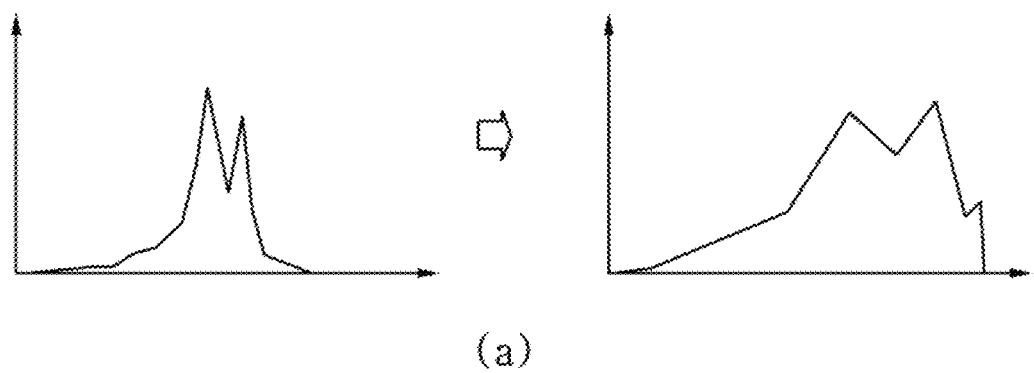
(a)
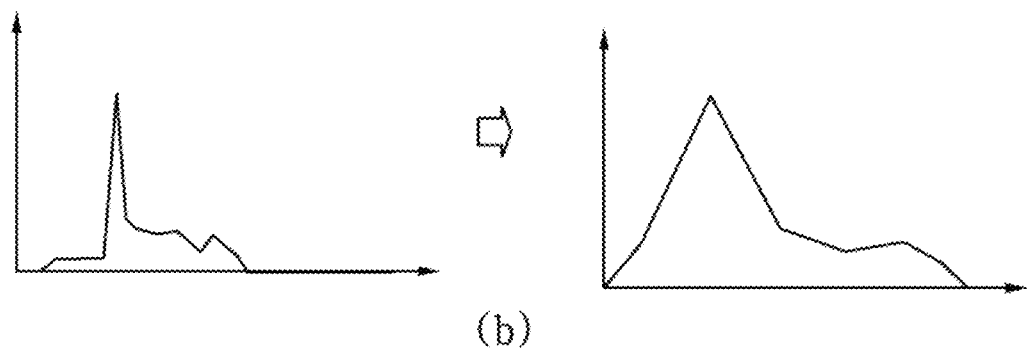
(b)

FIG. 13
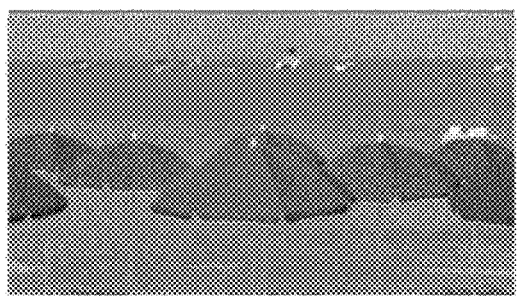  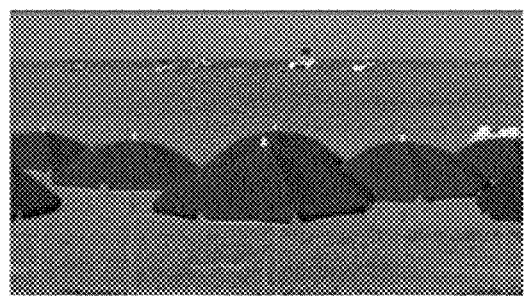
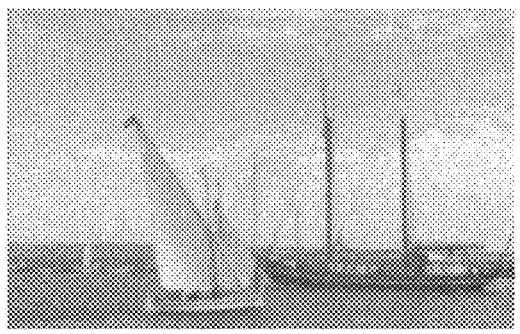  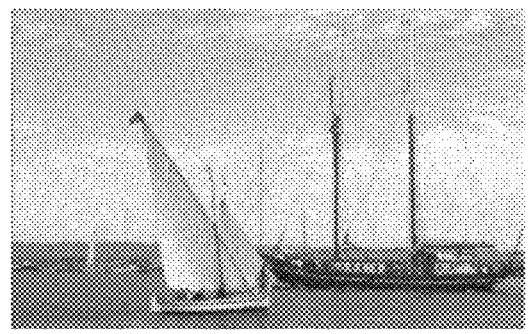

DISPLAY DEVICE

CROSS-REFERENCE TO RELATED APPLICATIONS

This application is the National Stage filing under 35 U.S.C. 371 of International Application No. PCT/KR2019/007422, filed on Jun. 20, 2019, the contents of which are all incorporated by reference herein in its entirety.

TECHNICAL FIELD

The present disclosure relates to a display device and, more particularly, to a display device in which the effect of dynamic tone mapping is enhanced.

BACKGROUND ART

The dynamic range of brightness perceived by the human eye forms a very wide range from hundreds of thousands to billions. As a specific unit of brightness, the human eye can distinguish between light and shade of 0.00001 to 1000000 nits. On the other hand, since a dynamic range of several hundred is sufficient to display most of the image information, a display device for reproducing a general image has a dynamic range of 256. However, in the case of generating an image similar to an actual natural image through extensive computation or in the case of a medical image that needs to express more detailed information, an image needs to be expressed with a dynamic range wider than 256.

That is, conventionally, an image input to the display is an image in a standard dynamic range (SDR) and the range of brightness is narrower than the range seen by the human eye. Therefore, there is a limit in realizing realistic image quality. For this purpose, high dynamic range (HDR) technology has emerged. HDR technology refers to technology for extending the range of brightness to be closer to what is seen by the human eye, by making bright areas brighter and making dark areas darker.

In order to reproduce an image (hereinafter referred to as HDR image) to which HDR technology applies by a general display device or a printing device, the image needs to be converted into an image having a limited dynamic range supported by each device. To this end, operation such as tone mapping is required. Tone mapping refers to a process of converting an HDR image into an image which has a limited dynamic range and can be reproduced by a display device or a printing device, that is, a low dynamic range (LDR) image.

Static tone mapping which is one of tone mapping has a limitation that the characteristics of an image is not reflected. Accordingly, recently, dynamic tone mapping in which a tone curve used for tone mapping is adaptively changed according to a scene is mainly used.

On the other hand, in dynamic tone mapping, the tone curve is changed according to maximum brightness of each scene, thereby adjusting brightness of the image. Since the luminance of the image is adjusted based on only the maximum brightness regardless of a subject displayed by each pixel, the brightness range of an output image is narrow or contrast is weak. That is, according to existing dynamic tone mapping, a problem that the image is output too brightly or darkly due to a narrow brightness range or a problem that it is difficult to distinguish between a bright area and a dark area occurs.

INVENTION

Technical Problem

The present disclosure relates to a display device capable of extending a brightness range of an image during dynamic tone mapping.

The present disclosure relates to a display device capable of further enhancing contrast of an image during dynamic tone mapping.

The present disclosure relates to a display device capable of expressing an image brighter and more clearly by extending a brightness range of an image and further enhancing contrast of an image during dynamic tone mapping.

Technical Solution

A display device according to an embodiment of the present disclosure comprises a controller configured to perform tone mapping for adjusting luminance of an input image using a tone curve, and a display configured to display an image whose luminance is adjusted by the tone mapping, wherein the controller separates an object and a background in the input image and adjusts luminance of at least one of the object or the background.

The controller increases luminance of the object in the input image.

The controller decreases luminance of the background in the input image.

The controller calculates a threshold value for separating the object and the background in the input image and changes the tone curve based on the threshold value.

The controller adjusts the luminance of at least one of the object or the background by changing the tone curve based on the threshold value.

The controller calculates the threshold value from the input image using an Otsu algorithm.

The controller compares the threshold value with a center value and changes the tone curve based on a result of comparison, and the center value is a median value of a signal level of the input image.

The controller changes the tone curve to decrease output luminance when the threshold value is greater than the center value and changes the tone curve to increase output luminance when the threshold value is less than the center value.

The controller classifies the signal level of the input image into a dark area class and a bright area class, and obtains whether to change output luminance of a dark area of the tone curve and whether to change output luminance of a bright area of the tone curve based on characteristics of each of the dark area class and the bright area class.

The controller calculates a dark area threshold value of the dark area class and a bright area threshold value of the bright area class, and obtains whether to change output luminance of a dark area of the tone curve and whether to change output luminance of a bright area of the tone curve based on the dark area threshold value and the bright area threshold value.

The controller decreases output luminance of the dark area of the tone curve, when the dark area threshold value is greater than a dark area reference value.

The controller increases output luminance of the bright area of the tone curve, when the bright area threshold value is less than a bright area reference value.

The controller decreases output luminance of the dark area of the tone curve when the dark area threshold value is greater than a dark area reference value, and increases output luminance of the bright area of the tone curve when the bright area threshold value is less than a bright area reference value.

The controller comprises a histogram calculator configured to obtain a histogram for a signal level of the input image, a maximum brightness extractor configured to obtain maximum brightness of the input image based on the histogram, a tone curve determiner configured to adjust a tone curve based on the maximum brightness, and a tone mapping performer configured to tone-map the input image using the tone curve adjusted by the tone curve determiner.

The controller further comprises a tone mapping enhancer configured to change the tone curve adjusted by the tone curve determiner based on characteristics of the input image, the tone mapping performer tone-maps the input image using the tone curve changed by the tone mapping enhancer.

The tone mapping enhancer comprises a brightness distribution conversion predictor configured to calculate a result of converting the input image using an electro-optical transfer function (EOTE), a tome mapping result predictor configured to tone-map an image calculated by the brightness distribution conversion predictor using the tone curve adjusted by the tone curve determiner, a threshold value calculator configured to calculate at least one threshold value from the image whose luminance is adjusted by the tone mapping result predictor, a brightness range extender configured to change the tone curve based on the threshold, and a contrast enhancer configured to change the tone curve changed by the brightness range extender based on the threshold value.

The tone curve determiner obtains a first tone curve, wherein the brightness range extender changes the first tone curve to a second tone curve, and wherein the contrast enhancer changes the second tone curve to a third tone curve.

The controller changes the tone curve such that a brightness range of a histogram according to a signal level of the input image is widened.

The controller changes the tone curve to increase a level of a bright area class of a histogram according to a signal level of the input image and to decrease a level of a dark area class of the histogram according to the signal level of the input image.

Effect of the Invention

According to an embodiment of the present disclosure, by separating an object and a background in an image and then selectively adjusting luminance of each of the object and the background, it is possible to more clearly display the image.

According to an embodiment of the present disclosure, since a tone curve is changed based on a threshold value for separating the object and the background, it is possible to express the object more clearly than the background.

In addition, according to an embodiment of the present disclosure, by selecting an extension direction of a brightness range and a contrast enhancement area according to the characteristics of an image when changing the tone curve, it is possible to display a bright and clear image by adjusting luminance of only a necessary portion.

DESCRIPTION OF DRAWINGS

FIGS. 9 to 11 are views illustrating a method of changing a tone curve to enhance contrast of an image by a display device according to an embodiment of the present disclosure.

FIG. 12 is a view illustrating a histogram of an HDR image signal input to a display device according to an embodiment of the present disclosure and a luminance histogram of an output image.

FIG. 13 is a view illustrating an output image according to the controller shown in FIG. 5 and an output image according to the controller shown in FIG. 6.

BEST MODE

Hereinafter, embodiments relating to the present disclosure will be described in detail with reference to the accompanying drawings. The suffixes "interface" for components used in the description below are assigned or mixed in consideration of easiness in writing the specification and do not have distinctive meanings or roles by themselves.

While ordinal numbers including 'first', 'second', etc. may be used to describe various components, they are not intended to limit the components. These expressions may be used to distinguish one component from another component.

Hereinafter, although a description will be given on the assumption that a display device is a smart TV supporting a broadcast reception function, the display device may include a smartphone, etc. That is, the display device according to an embodiment of the present disclosure does not necessarily include the components shown in FIG. 1.

Figure 1:
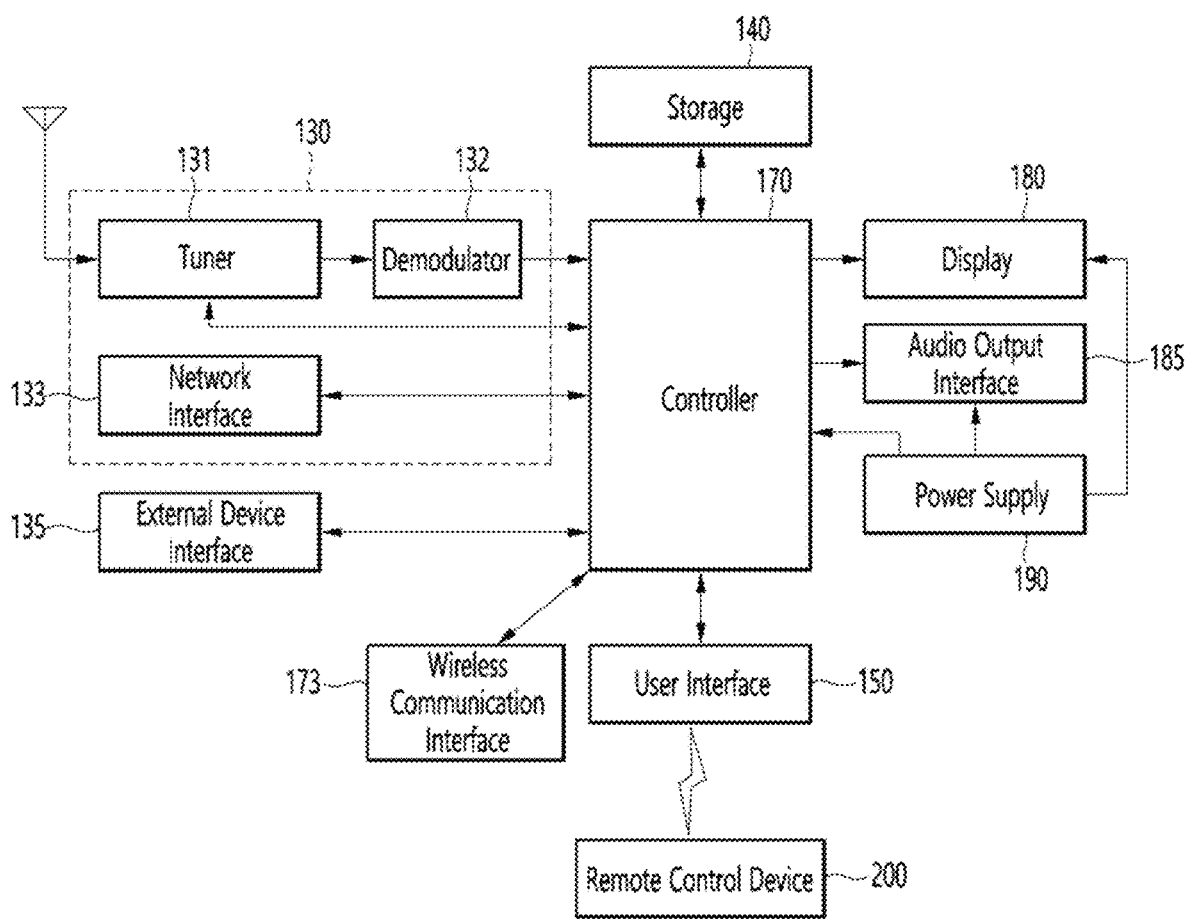
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
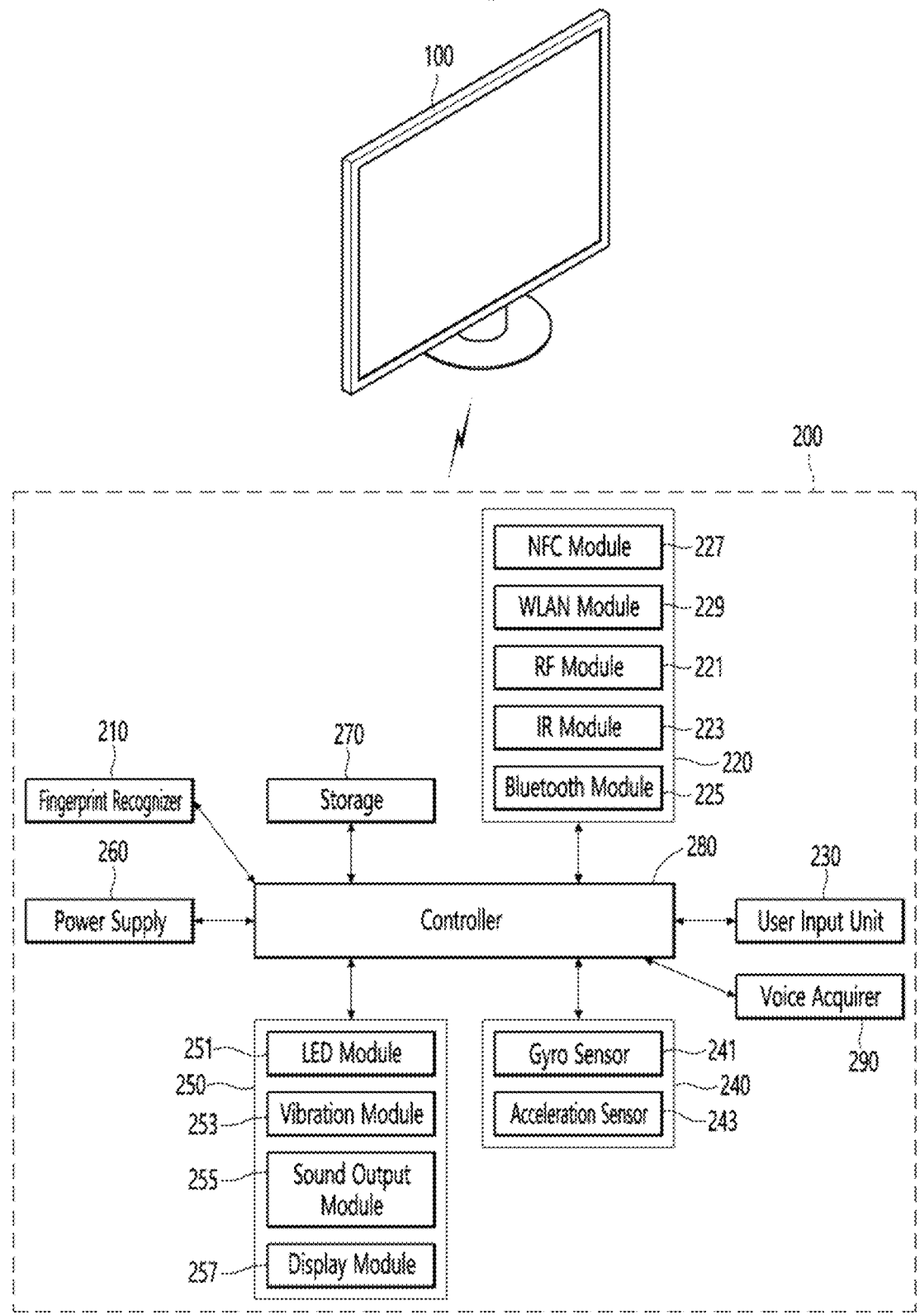
FIG. 2 is a block diagram illustrating a remote control device according to an embodiment of the present disclosure.
Figure 3:
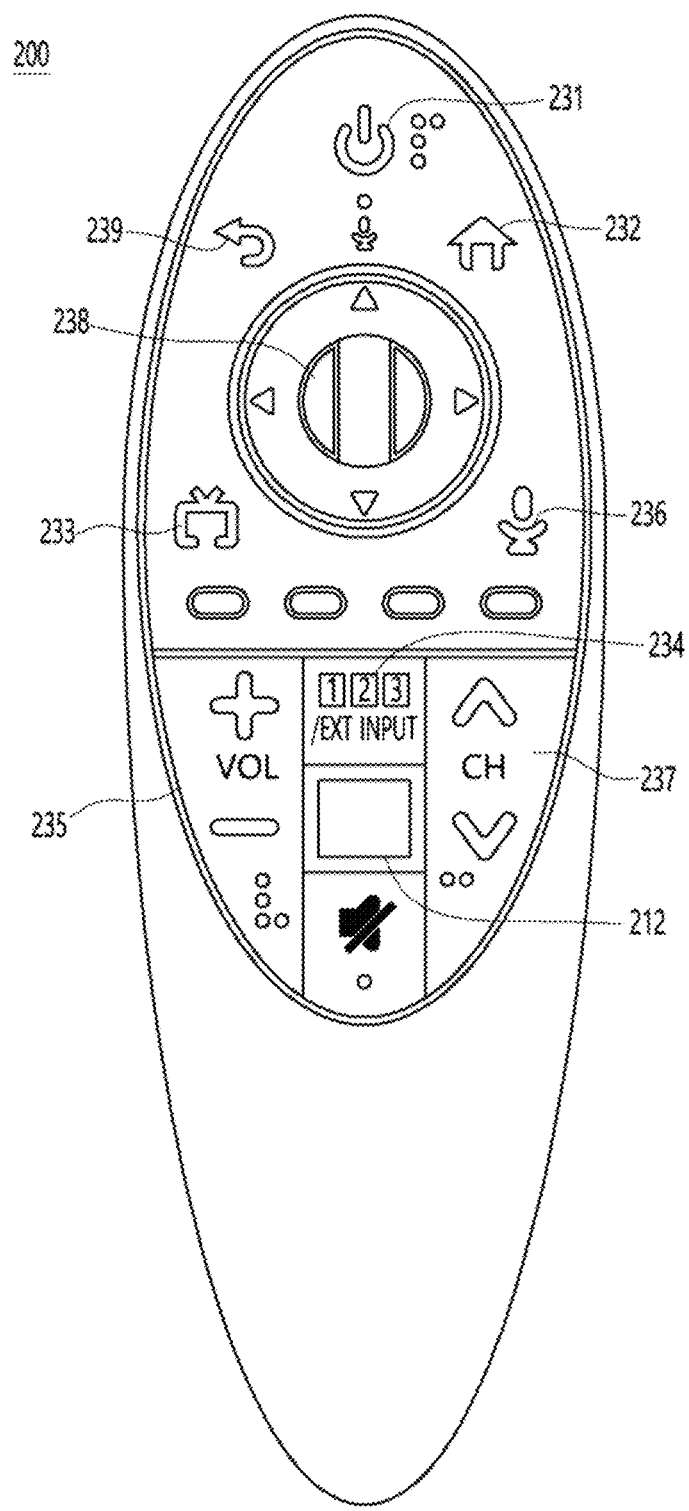
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
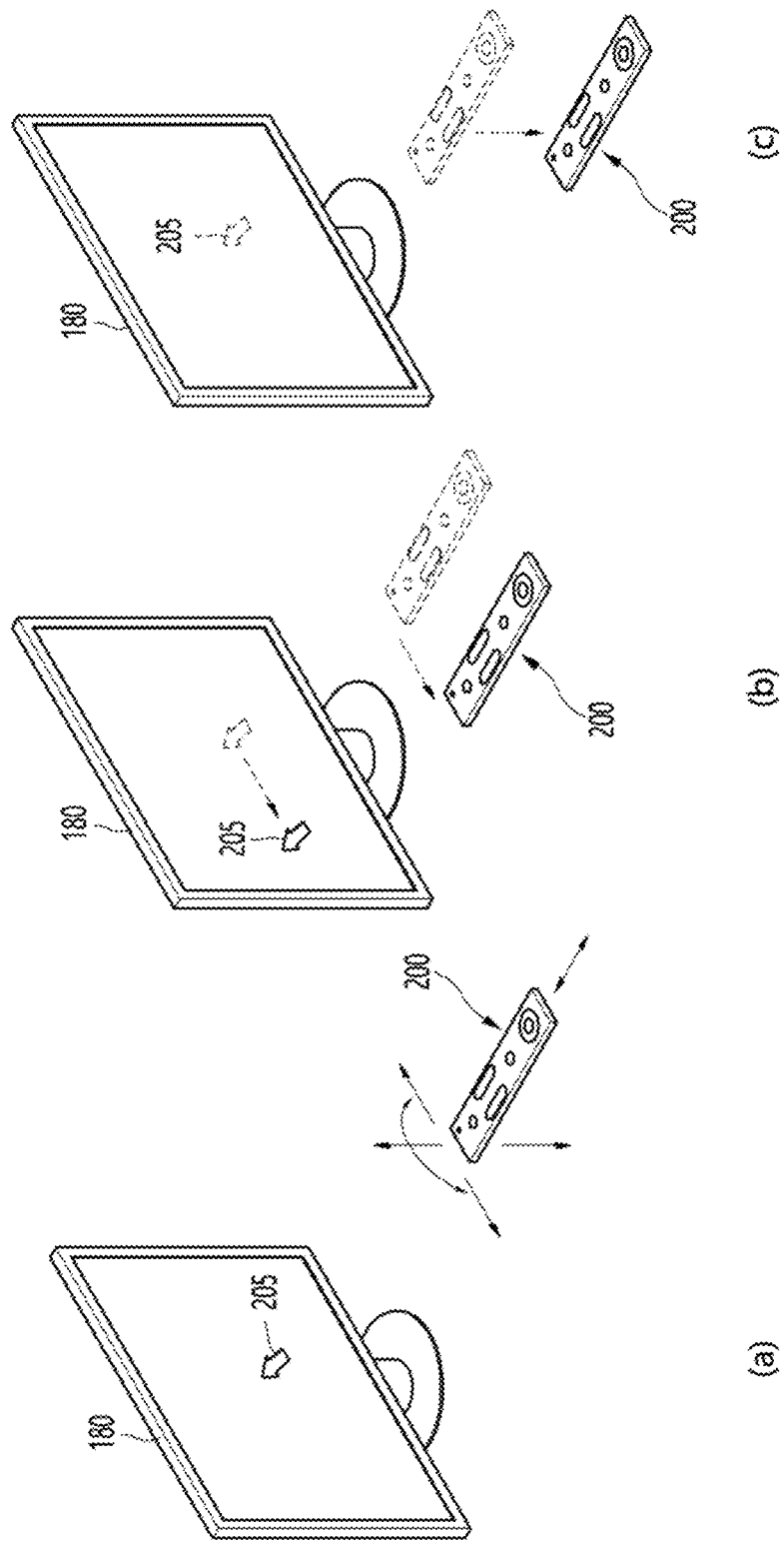
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
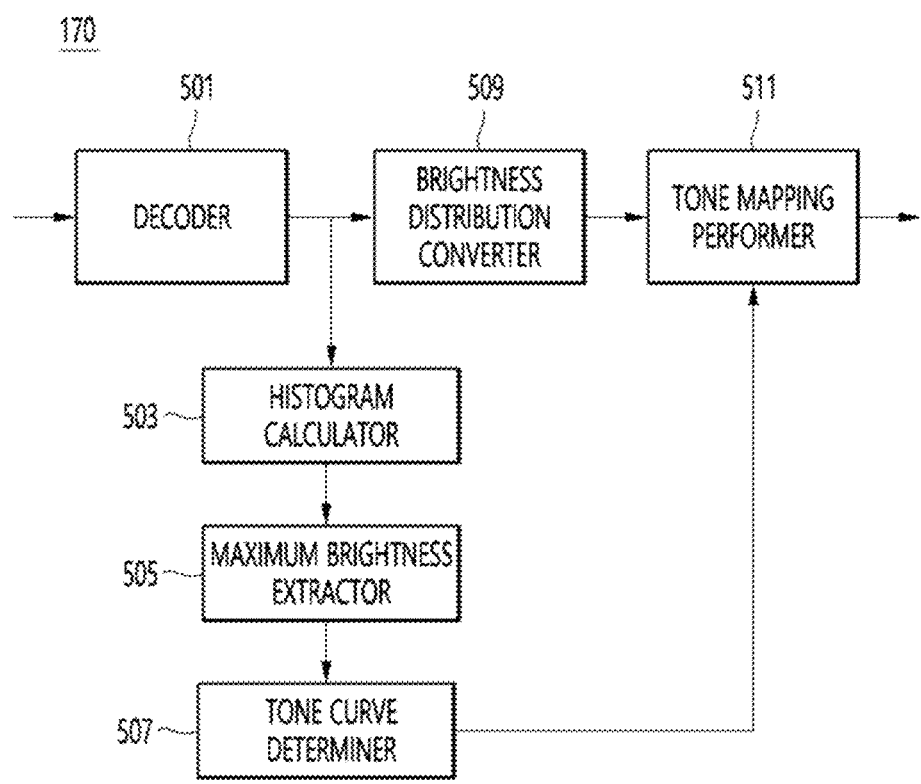
FIG. 5 is a block diagram illustrating a method of performing tone mapping by a display device according to a first embodiment of the present disclosure.

FIG. 5 is a block diagram illustrating a method of performing tone mapping by a display device according to a first embodiment of the present disclosure.

In particular, FIG. 5 may correspond to an example of the internal block diagram of the controller shown in FIG. 1.

The controller 170 may adjust luminance of an input image using a tone curve.

According to the first embodiment, the controller 170 may include a decoder 501, a histogram calculator 503, a maximum brightness extractor 505, a tone curve determiner 507, a brightness distribution converter 509 and a tone mapping performer 511.

The decoder 501 may receive an HDR image. The decoder 501 may receive the HDR image from the outside and the decoder 501 may decode the received HDR image.

Meanwhile, the decoder 501 may also receive metadata when receiving the HDR image. The metadata may include information on the HDR image. The metadata may include at least one of luminance information of the HDR image, maximum brightness information of each scene or identification information for identifying the HDR image.

The histogram calculator 503 may calculate the histogram of the HDR image. The histogram of the HDR image may mean distribution information of respective brightness values of the pixels of the HDR image. The histogram calculator 503 may calculate a histogram which is a distribution diagram for respective signal levels (e.g., 0 to 123) of the pixels of the HDR image.

The histogram calculator 503 may calculate the histogram of the HDR image based on at least one of the metadata or the HDR image decoded by the decoder 501.

The maximum brightness extractor 505 may extract the maximum brightness of each scene of the HDR image. The maximum brightness extractor 505 may extract the maximum brightness of each scene of the HDR image based on the histogram of the HDR image calculated by the histogram calculator 503. Alternatively, the maximum brightness extractor 505 may extract the maximum brightness of each scene of the HDR image based on the metadata received together with the HDR image.

The tone curve determiner 507 may determine a tone curve to perform tone mapping on the HDR image. The tone curve may be a curve for mapping the brightness range of the HDR image to a luminance range which may be output by the display 180.

The tone curve determiner 507 may determine a tone curve for adjusting luminance of the HDR image to fit the luminance range which may be output by the display 180, based on the peak brightness of the HDR image.

The brightness distribution converter 509 may output brightness information of HDR image pixels using an Electro-Optical Transfer Function (EOTF). The brightness distribution converter 509 may convert the HDR image received as an electrical signal into an original linear color.

The tone mapping performer 511 may perform tone mapping on the HDR image output from the brightness distribution converter 509. In particular, the tone mapping performer 511 may perform tone mapping on the HDR image using the tone curve determined by tone curve determiner 507. Tone mapping may be a process of converting the HDR image into an image which has a limited dynamic range and may be displayed on the panel (not shown) of the display 180, that is, a Low Dynamic Range (LDR) image.

The tone mapping performer 511 adjusting luminance using the tone curve determined by the tone curve determiner 507 may be referred to as dynamic tone mapping.

The tone mapping performer 511 may output the tone-mapped HDR image on the panel (not shown) of the display 180.

According to the first embodiment of the present disclosure, when tone mapping is performed by adjusting the tone curve based on the peak brightness of the HDR image, it is possible to output an image more clearly by reflecting the image characteristics of each scene.

Figure 6:
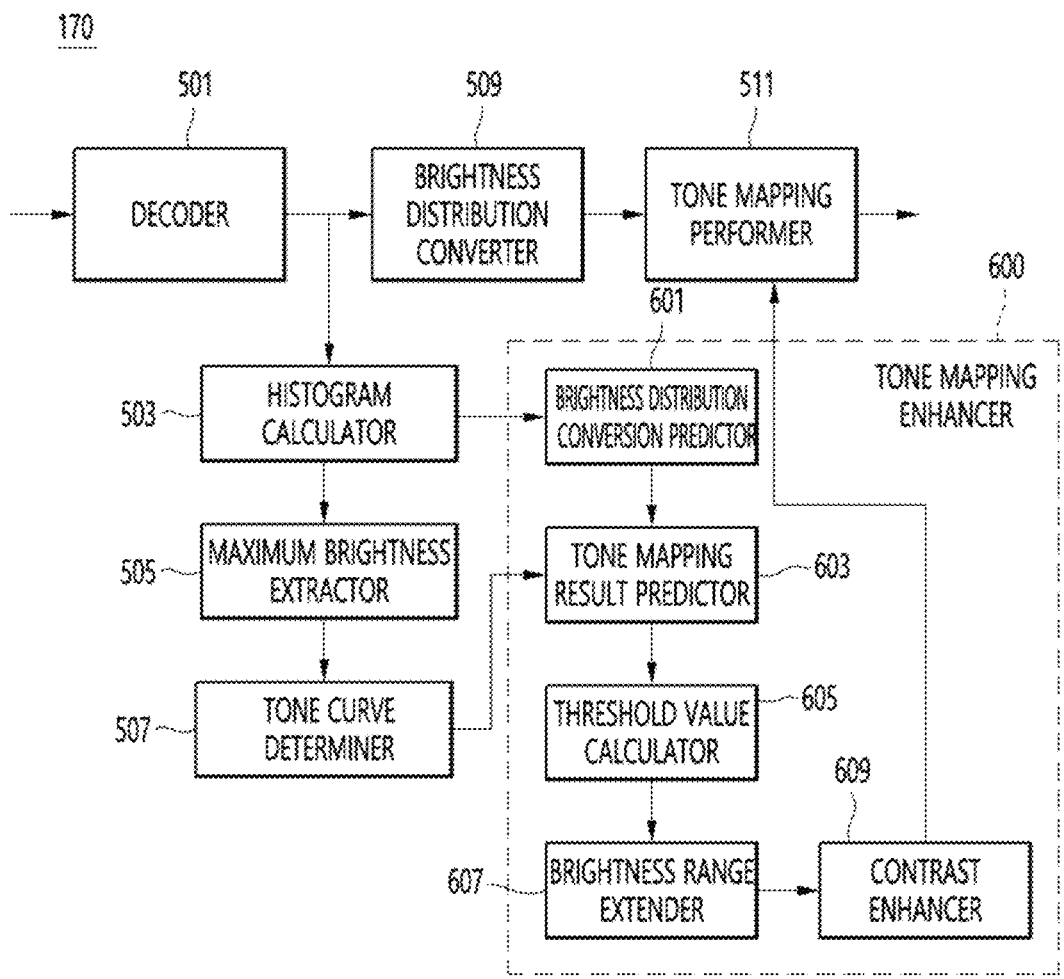
FIG. 6 is a block diagram illustrating a method of performing tone mapping by a display device according to a second embodiment of the present disclosure.

FIG. 6 is a block diagram illustrating a method of performing tone mapping by a display device according to a second embodiment of the present disclosure.

Similarly, FIG. 6 may correspond to an example of the internal block diagram of the controller shown in FIG. 1.

The controller 170 may adjust luminance of an input image using a tone curve, and the display 180 may display an image whose luminance is adjusted by tone mapping.

According to the second embodiment, the controller 170 may include a decoder 501, a histogram calculator 503, a maximum brightness extractor 505, a tone curve determiner 507, a brightness distribution converter 509, a tone mapping performer 511 and a tone mapping enhancer 600.

The decoder 501, the histogram calculator 503, the maximum brightness extractor 505, the tone curve determiner 507 and the brightness distribution converter 509 are the same as those described with reference to FIG. 5 and a repeated description thereof will be omitted.

The tone mapping performer 511 may perform tone mapping on the HDR image output from the brightness distribution converter 509. In particular, according to the second embodiment, the tone mapping performer 511 may perform tone mapping on the HDR image using the tone curve determined by the tone mapping enhancer 600.

The tone mapping performer 511 may output the HDR image subjected to tone mapping to the display 180.

The tone mapping enhancer 600 may predict a result of tone mapping by the tone curve determined by tone curve determiner 507 and change the tone curve based on the predicted result.

The tone mapping enhancer 600 may calculate in advance a result when the tone curve determined by the tone curve determiner 507 applies to the HDR image and extend the brightness range of the output image based on the calculated result or change the tone curve to enhance the contrast of the output image.

The tone mapping enhancer 600 may include at least one of a brightness distribution conversion predictor 601, a tone mapping result predictor 603, a threshold value calculator 605, a brightness range extender 607 or a contrast enhancer 609.

The distribution conversion predictor 601 may calculate the brightness information of HDR image pixels to be output by the brightness distribution converter 509. That is, the distribution conversion predictor 601 may perform the same operation as the brightness distribution converter 509. In the tone mapping enhancer 600, in order to output the result of tone mapping using the tone curve determined by the tone curve determiner 507, the distribution conversion predictor 601 may output the brightness information of the HDR image pixels in the same manner as the brightness distribution converter 509.

The distribution conversion predictor 601 may output the brightness information of the HDR image pixels using an Electro-Optical Transfer Function (EOTF) in the same manner as the brightness distribution converter 509. Alternatively, the distribution conversion predictor 601 may receive the brightness information of the HDR image pixels from the brightness distribution converter 509.

The tone mapping result predictor 603 may calculate a result of performing tone mapping on the HDR image output by the distribution conversion predictor 601 using the tone curve determined by the tone curve determiner 507.

That is, the tone mapping result predictor 603 may predict the output image when tone mapping is performed on the HDR image using the tone curve determined by the tone curve determiner 507. The tone mapping result predictor 603 may tone-map the image calculated by the distribution conversion predictor 601 using the tone curve adjusted by the tone curve determiner 507.

The threshold value calculator 605 may calculate a threshold value based on the output image predicted by the tone mapping result predictor 603. The threshold value calculator 605 may calculate at least one threshold value from the image whose luminance is adjusted by the tone mapping result predictor 603. For example, the threshold value calculator 605 may calculate a threshold value for distinguishing between a bright area class and a dark area class of the image, a threshold value in the bright area class and a threshold value in the dark area class.

The threshold value may be a value for separating an object and a background in the image.

In the present disclosure, the threshold value indicates the characteristics of an image to be output and may be a reference value for extending the brightness range of the image. Alternatively, the threshold value may be a value a reference value for distinguishing between the dark area class and the bright area class.

The threshold value may be a reference value for determining whether the image is output too brightly or darkly due to a narrow brightness range of the image. Alternatively, the threshold value may be a reference value for class distinguishment for determining a contrast enhancement area of the image.

According to an embodiment, the threshold value calculator 605 may calculate the threshold value using an Otsu algorithm.

The Otsu algorithm is a method of finding T which minimizes an intra-class variance or maximizes inter-class variance between two classes when pixels of the image are classified into two classes based on the threshold value T. When a ratio of pixels darker than the threshold value T in the input image is $\alpha$, a brightness average is $\mu1$, a variance is $\sigma1^2$, a ratio of pixels brighter than the threshold value T is $\beta$, a brightness average is $\mu2$ and a variance is $\sigma2^2$, ($\alpha+\beta=1$), intra-class variance and inter-class variance are calculated by Equations 1 and 2 below.

$$\text{intra-class variance} = \alpha\sigma1^2 + \beta\sigma2^2 \quad [\text{Equation 1}]$$

$$\text{inter-class variance} = \alpha\beta(\mu1-\mu2)^2 \quad [\text{Equation 2}]$$

That is, the Otsu algorithm is a method of obtaining T in which the intra-class variance is minimized or T which the inter-class variance is maximized while the threshold value T is changed stepwise from a minimum value (e.g., 0) to a maximum value (e.g., 1023).

The threshold value calculator 605 may recognize T obtained through Otsu algorithm as the threshold value for separating the object and the background in the image.

That is, the threshold value calculator 605 may separate the object and the background in the input image. The threshold value calculator 605 may recognize pixels having signal levels less than the threshold value as pixels corresponding to the object, and recognize pixels having signal levels greater than the threshold value as pixels corresponding to the background, based on the threshold value, thereby separating the object and the background in the input image.

The contrast enhancer 609 which will be described later may increase the luminance of the object by changing the luminance adjustment portion of the pixels corresponding to the object in the turn curve or decrease the luminance of the background by changing the luminance adjustment portion of the pixels corresponding to the background in the tone curve.

That is, the tone mapping enhancer 600 may separate the object and the background in the input image through the threshold value calculator 605, and change the tone curve such that the luminance of at least one of the object or background is adjusted through the contrast enhancer 609.

The brightness range extender 607 may determine whether the brightness range extends or the extension direction of the brightness range, based on the threshold value calculated through the threshold value calculator 605.

The brightness range may mean a distance from minimum brightness to maximum brightness of the expected output image.

The narrower the brightness range, the higher the possibility that the image is too bright or dark. In particular, as the brightness range is narrow and the threshold value is farther from a center value, the image may be output too brightly or darkly.

Accordingly, the brightness range extender 607 may compare the threshold value with the center value and change the tone curve based on a result of comparison.

The brightness range extender 607 may determine whether the brightness range extends and the extension direction of the brightness range, by comparing the threshold value with the center value.

The center value may mean a median value among image signal levels. For example, the signal level of the input HDR image may be 0 to 1,023, and, in this case, the center value may be 512.

The brightness range extender 607 may compare the threshold value with the center value, and change the tone curve such that the threshold value becomes closer to the center value. In addition, when the tone curve is changed such that the threshold value becomes closer to the center value, the brightness range may extend together.

The brightness range extender 607 may change the tone curve to decrease the threshold value when the threshold value is greater than the center value, and change the tone curve to increase the threshold value when the threshold value is less than the center value.

Meanwhile, the brightness range extender 607 may determine a degree of extension of the brightness range after determining the extension direction of the brightness range such that the threshold value becomes closer to the center value.

According to an embodiment, the brightness range extender 607 may change the tone curve such that the threshold value moves toward the center value by a predetermined change. For example, when the threshold value is calculated as 700 and the change is set to 100, the tone curve may be changed such that the threshold value is changed from 700 to 600.

According to another embodiment, the brightness range extender 607 may change the tone curve such that the threshold value matches the center value. For example, when the threshold value is 700, the tone curve may be changed such that the threshold value is changed from 700 to 512.

The contrast enhancer 609 may classify the signal level of the input image into a dark area class and a bright area class and obtain whether to change the output luminance of a dark area of the tone curve and whether to change the output luminance of a bright area of the tone curve based on the characteristics of each of the dark area class and the bright area class. In this case, the dark area class may represent pixels representing the background of the image and the bright area class may represent pixels representing the object of the image.

When the image signal is classified into the bright area class and the dark area class, the contrast enhancer 609 may determine whether to enhance contrast of each of the bright area class and the dark area class, and change the tone curve according to whether to enhance contrast. That is, the contrast enhancer 609 may change the tone curve after obtaining whether to increase the luminance of the object of the image or whether to decrease the luminance of the background of the image.

The contrast enhancer 609 may increase the luminance of the object in the input image by changing the tone curve to increase the output luminance of the bright area class and decrease the luminance of the background in the input image by changing the tone curve to decrease the output luminance of the dark area class.

First, a method of classifying the image signal into the bright area class and the dark area class by the contrast enhancer 609 will be described.

According to an embodiment, the contrast enhancer 609 may classify pixels having image signal levels of 0 to 511 as the bright area class and classify pixels having image signal levels of 512 to 1023 as the dark area class.

According to another embodiment, the contrast enhancer 609 may classify the image signal into the bright area class and the dark area class, based on the threshold value calculated by the threshold value calculator 605. For example, the contrast enhancer 609 may classify pixels having the level of the image signal less than the threshold value calculated by the threshold value calculator 605 as the bright area class, and classify pixels having the level of the image signal greater than the threshold value calculated by the threshold value calculator 605 as the dark area class.

Next, a method of determining whether to enhance contrast of each of the bright area class and the dark area class by the contrast enhancer 609 will be described.

The contrast enhancer 609 may determine whether to enhance contrast, by calculating a bright area threshold value and a dark area threshold value with respect to the bright area class and the dark area class. The contrast enhancer 609 may obtain whether to change the output luminance of the dark area of the tone curve based on the dark area threshold value, and obtain whether to change the output luminance of the bright area of the tone curve based on the bright area threshold value.

The contrast enhancer 609 may calculate the bright area threshold value and the dark area threshold value through the threshold value calculator 605.

The threshold value calculator 605 may calculate the bright area threshold value and the dark area threshold value. The threshold value calculator 605 may calculate the bright area threshold value by applying the Otus algorithm to the pixels corresponding to the bright area class and calculate the dark area threshold value by applying the Otus algorithm to the pixels corresponding to the dark area class.

The contrast enhancer 609 may change the tone curve such that the bright area threshold value becomes closer to a bright area reference value and change the tone curve such that the dark area threshold value becomes closer to a dark area reference value. The contrast enhancer 609 may decrease the output luminance of the dark area of the tone curve when the dark area threshold value is greater than the dark area reference value, and increase the output luminance of the bright area of the tone curve when the bright area threshold value is less than the bright area reference value.

According to an embodiment, the bright area reference value and the dark area reference value may be preset fixed values. For example, the bright area reference value may be 800 and the dark area reference value may be 200, but this is only an example. In this case, the contrast enhancer 609 may change the tone curve such that the bright area threshold value becomes closer to 800 and change the tone curve such that the dark area threshold value becomes closer to 200.

In this case, the contrast enhancer 609 may change the threshold value by a preset change in a reference value direction or change the threshold value to match the reference value. For example, the contrast enhancer 609 may change the tone curve according to a difference between the bright area threshold value and the bright area reference value and a difference between the dark area threshold value and the dark area reference value. That is, the contrast enhancer 609 may change the tone curve by increasing the change as a value obtained by subtracting the bright area threshold value from the bright area reference value increases and increasing the change as a value obtained by subtracting the dark area reference value from the dark area threshold value increases. As another example, the contrast enhancer 609 may change the tone curve such that the bright area threshold value and the dark area threshold value are respectively changed to the bright area reference value and the dark area reference value.

According to another embodiment, the bright area reference value may be an average value of the bright area class, and the dark area reference value may be an average value of the dark area class. Similarly, in this case, the contrast enhancer 609 may change the threshold value by a preset change in a reference value direction or change the threshold value to match the reference value.

According to another embodiment, the contrast enhancer 609 may set the bright area reference value for each the bright area threshold value and set the dark area reference value for each dark area threshold value. For example, the contrast enhancer 609 may set the bright area reference value to 750 when the bright area threshold value is 700, and set the bright area reference value to 760 when the bright area threshold value is 720. In this case, it is possible to minimize distortion of the image.

The contrast enhancer 609 may increase the contrast of the image by changing the tone curve such that the luminance of the object increases or the luminance of the background decreases after separating the object and background of the input image. The contrast enhancer 609 may increase only the luminance of the object, decrease only the luminance of the background or decrease the luminance of the background while increasing the luminance of the object.

Methods of changing the tone curve by the brightness range extender 607 and the contrast enhancer 609 will be described in greater detail with reference to FIGS. 7 to 11.

The tone mapping performer 511 may receive the tone curve from the tone mapping enhancer 600. The tone mapping performer 511 may receive the tone curve determined by tone curve determiner 507 and then changed through the brightness range extender 607 and the contrast enhancer 609.

The tone mapping performer 511 may perform tone mapping on the HDR image output from the brightness distribution converter 509 using the tone curve received from the mapping enhancer 600, and the display 180 may display the image whose luminance is adjusted according to tone mapping.

Figure 7:
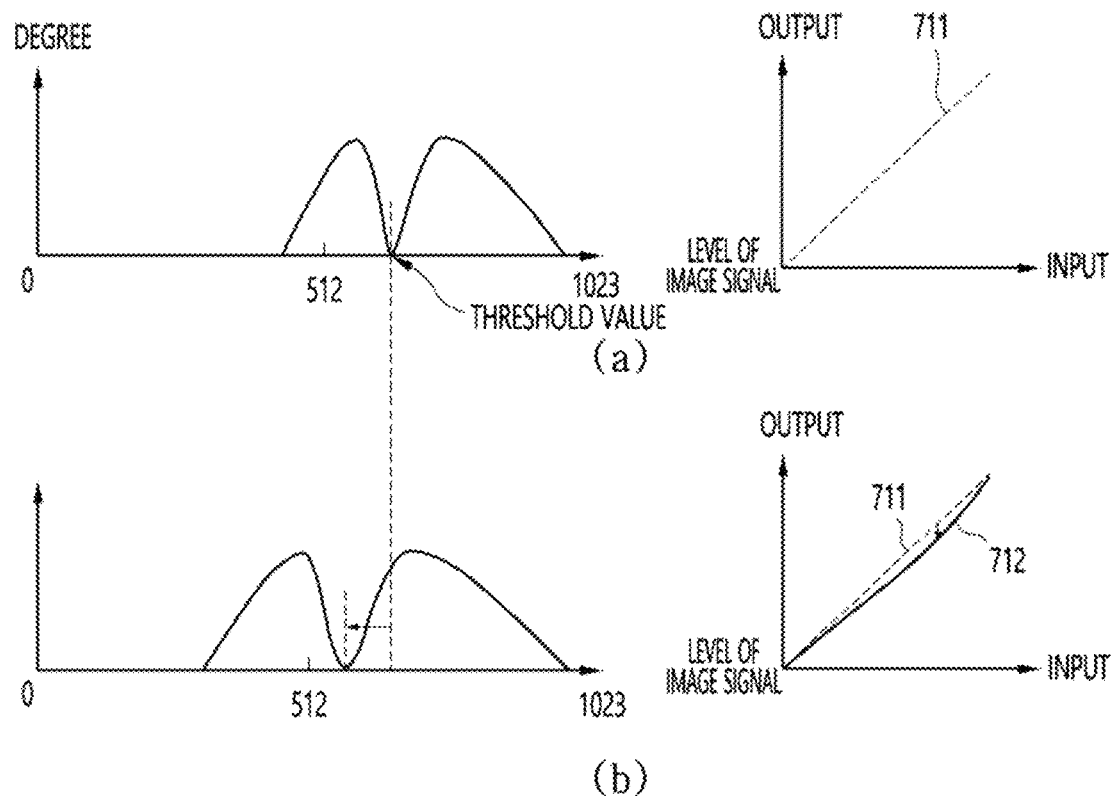
FIGS. 7 to 8 are views illustrating a method of changing a tone curve to extend a brightness range of an image, by a display device according to an embodiment of the present disclosure.
Figure 8:
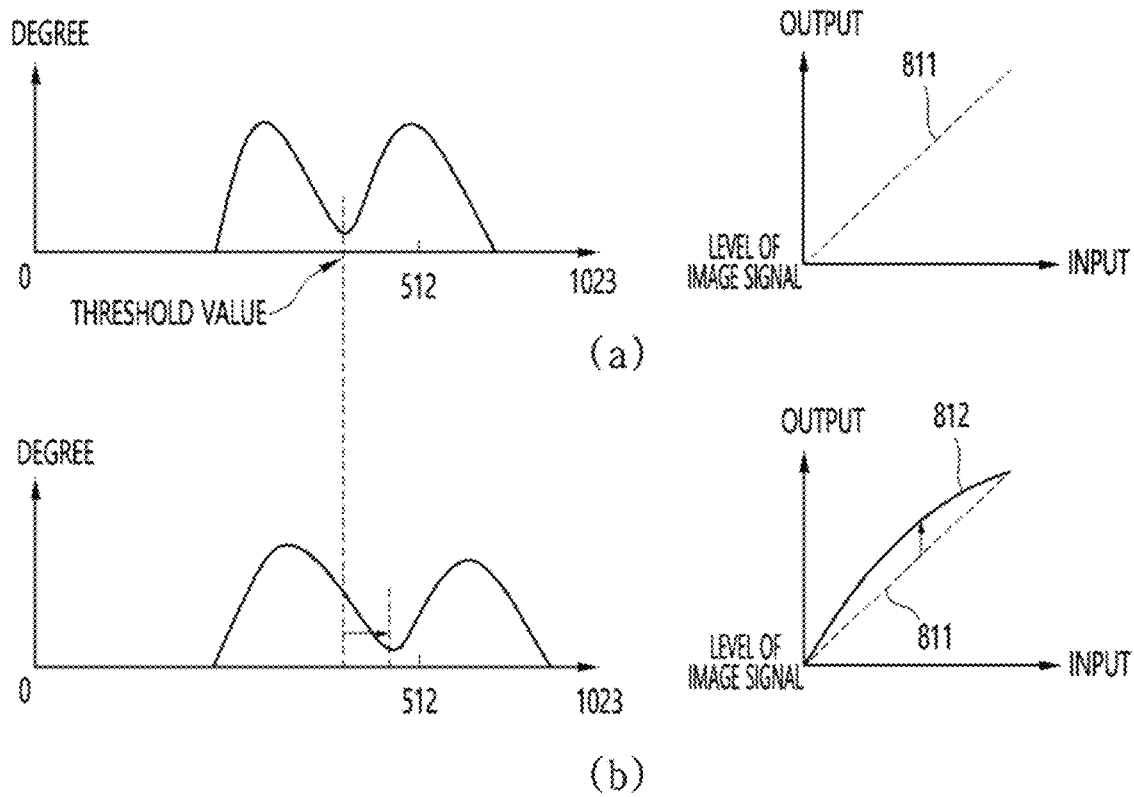

FIGS. 7 to 8 are views illustrating a method of changing a tone curve to extend a brightness range of an image, by a display device according to an embodiment of the present disclosure.

The left graphs of FIGS. 7 and 8 may be histograms for the level of an image signal and the right graphs of FIGS. 7 and 8 may be tone curves.

The tone curve may represent the output luminance with respect to the input luminance. For example, the range of the input luminance shown in FIG. 7 may be 0 to 10,000 nits and the range of the output luminance may be 0 to 1,000 nits, but this is only an example and is not limited thereto.

The histogram shown in (a) of FIG. 7 may be a histogram for an output image predicted by the tone mapping result predictor 603. The threshold value calculator 605 may calculate the threshold value based on the histogram shown in (a) of FIG. 7, and, in this case, the threshold value may be greater than the center value (e.g., 512). A first tone curve 711 shown in (a) of FIG. 7 may be a tone curve determined by tone curve determiner 507.

Since the threshold value calculated by the threshold value calculator 605 is greater than the center value, the brightness range extender 607 may change the tone curve in a direction in which the threshold value decreases. For example, the brightness range extender 607 may decrease the threshold value by changing the first tone curve 711 to a second tone curve 712 shown in (b) of FIG. 7. In this case, the output luminance of the second tone curve 712 may be less than that of the first tone curve 711.

That is, when the threshold value is greater than the center value, the brightness range extender 607 may change the tone curve to decrease the output luminance of the tone curve determined by tone curve determiner 507. As such, the histogram of the image to be output when applying the changed tone curve to the HDR image may be changed from the histogram shown in (a) of FIG. 7 to the histogram shown in (b) of FIG. 7. That is, as shown in (b) of FIG. 7, when applying the changed tone curve to the HDR image, the threshold value may become closer to the center value.

In addition, the brightness range of the image to be output by the changed tone curve may be widened. It can be seen that a distance between a minimum level and a maximum level of the histogram shown in (b) of FIG. 7 is greater than a distance between a minimum level and a maximum level of the histogram shown in (a) of FIG. 7. As such, when the brightness range of the output image extends, expressing the image too brightly may be minimized and the image is expressed more abundantly.

Similarly, the histogram shown in (a) of FIG. 8 may be a histogram for an output image predicted by the tone mapping result predictor 603, and, when the threshold value calculator 605 calculates the threshold value based on the histogram shown in (a) of FIG. 8, the threshold value may be less than the center value. A first tone curve 811 shown in (a) of FIG. 8 may be a tone curve determined by tone curve determiner 507.

Since the threshold value calculated by the threshold value calculator 605 is less than the center value, the brightness range extender 607 may change the tone curve in a direction in which the threshold value increases. For example, the brightness range extender 607 may increase the threshold value by changing the first tone curve 811 to a second curve 812 shown in (b) of FIG. 8. In this case, the output of the second tone curve 812 may be greater than that of the first tone curve 811.

That is, when the threshold value is less than the center value, the brightness range extender 607 may change the tone curve to increase the output luminance of the tone curve determined by tone curve determiner 507. As such, the histogram of the image to be output when applying the changed tone curve to the HDR image may be changed from the histogram shown in (a) of FIG. 8 to the histogram shown in (b) of FIG. 8. That is, as shown in (b) of FIG. 8, when applying the changed tone curve to the HDR image, the threshold value may become closer to the center value.

That is, the brightness range extender 607 may change the tone curve to increase the brightness range of the histogram according to the signal level of the input image.

In addition, the brightness range of the image to be output by the changed tone curve may be widened. It can be seen that a distance between a minimum level and a maximum level of the histogram shown in (b) of FIG. 8 is greater than a distance between a minimum level and a maximum level of the histogram shown in (a) of FIG. 8. As such, when the brightness range of the output image extends, expressing the image too darkly may be minimized and the image is expressed more abundantly.

Figure 9:
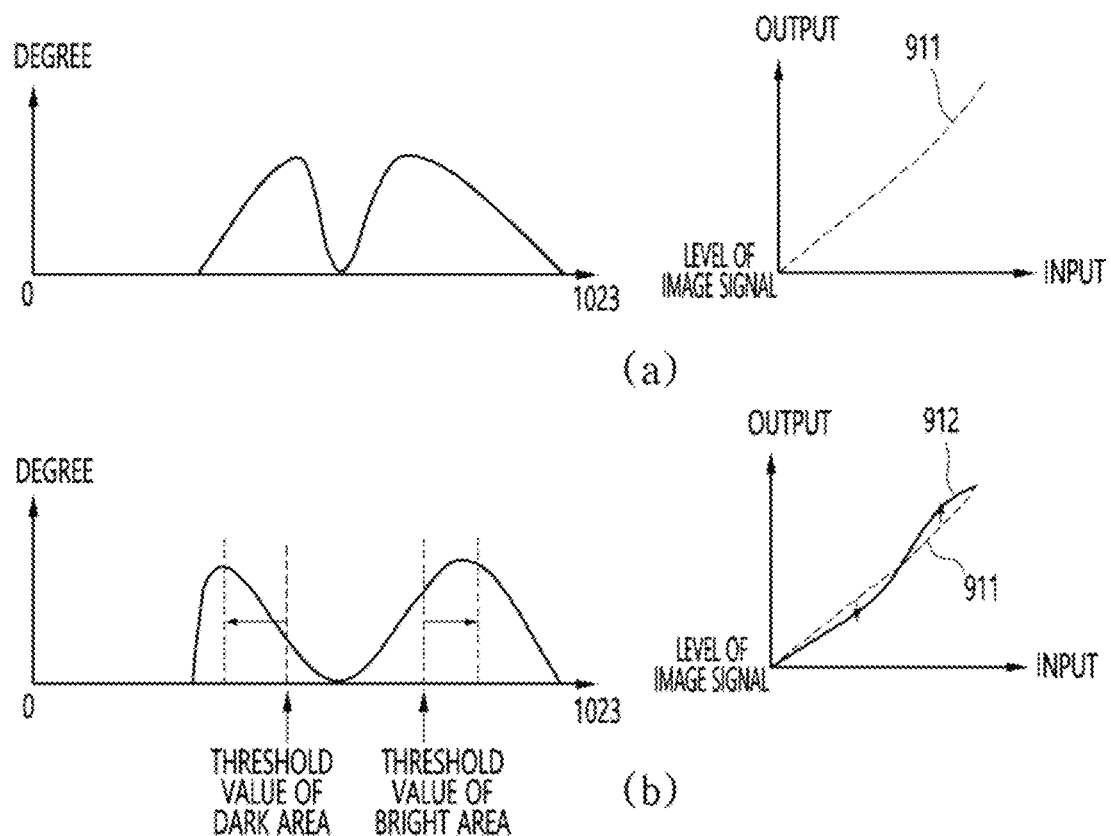

FIGS. 9 to 11 are views illustrating a method of changing a tone curve to enhance contrast of an image by a display device according to an embodiment of the present disclosure.

Similarly, the left graphs of FIGS. 9 to 10 may be histograms for the level of an image signal and the right graphs of FIGS. 9 to 1 may be tone curves.

The tone curve may represent the output luminance with respect to the input luminance. For example, the range of the input luminance shown in FIG. 8 may be 0 to 10,000 nits and the range of the output luminance may be 0 to 1,000 nits, but this is only an example and is not limited thereto.

The histogram shown in (a) of FIG. 9 may be a histogram for an image when applying the tone curve changed by the brightness range extender 607. A second tone curve 911 shown in (a) of FIG. 9 may be a tone curve changed by the brightness range extender 607.

The contrast enhancer 609 may calculate the dark area threshold value which is the threshold value of the dark area class and the bright area threshold value which is the threshold value of the bright area class using the threshold value calculator 605. Hereinafter, the dark area class may be a set of pixels representing the background, and the bright area class may be a set of pixels representing the object.

The contrast enhancer 609 may change the tone curve, such that the dark area threshold value becomes closer to the dark area reference value when the dark area threshold value is greater than the dark area reference value and the bright area threshold value becomes closer to the bright area reference value when the bright area threshold value is less than the bright area reference value. Specifically, the contrast enhancer 609 may change the tone curve by decreasing the output luminance with respect to the input luminance representing a dark area of the tone curve and increasing the output luminance with respect to the input luminance representing a bright area. That is, the contrast enhancer 609 may change the tone curve from a second tone curve 911 to a third tone curve 912. In this case, the output luminance of the third tone curve 912 for the dark area may be less than that of the second tone curve 911, and the output luminance of the third tone curve 912 for the bright area may be greater than that of the second tone curve 911.

The input luminance representing the dark area is a minimum luminance (e.g., 0 nits) to an intermediate luminance value (e.g., 5,000 nits) and the input luminance representing the bright area is an intermediate luminance value (e.g., 5,000 nits) to a maximum luminance value (e.g., 10,000 nits).

Therefore, by increasing the luminance of the object while decreasing the luminance of the background, the contrast of the image is output highly.

That is, by adjusting an area which is brightly displayed even in a dark area to be displayed darker and an area which is darkly displayed even in a bright area to be displayed brighter, it is possible to increase the contrast of the image.

Similarly, the histogram shown in (a) of FIG. 10 may be a histogram of an image when applying the tone curve changed by brightness range extender 607. A second tone curve 1011 shown in (a) of FIG. 10 may be a tone curve changed by the brightness range extender 607.

The contrast enhancer 609 may calculate the dark area threshold value which is the threshold value of the dark area class and the bright area threshold value which is the threshold value of the bright area class, using the threshold value calculator 605.

The contrast enhancer 609 may not change the tone curve for the dark area, when the dark area threshold value is equal to the dark area reference value or is close to the dark area reference value. In contrast, the contrast enhancer 609 may change the tone curve such that the bright area threshold value becomes close to the bright area reference value when the bright area threshold value is less than the bright area reference value. Specifically, the contrast enhancer 609 may change the tone curve, by maintaining the output luminance with respect to the input luminance representing the dark area of the tone curve and increasing the output luminance with respect to the input luminance representing the bright area. That is, the contrast enhancer 609 may change the tone curve from a second tone curve 1011 to a third tone curve 1012. In this case, the output luminance of the third tone curve 1012 for the dark area may be equal to that of the second tone curve 1011, and the output luminance of the third tone curve 1012 for the bright area may be greater than that of the second tone curve 1011.

The input luminance representing the dark area is a minimum luminance (e.g., 0 nits) to an intermediate luminance value (e.g., 5,000 nits) and the input luminance representing the bright area is an intermediate luminance value (e.g., 5,000 nits) to a maximum luminance value (e.g., 10,000 nits).

Therefore, by increasing the luminance of the object, the contrast of the image is output highly.

That is, by not performing separate adjustment when the dark area is expressed with appropriate brightness and adjusting only an area which is displayed darkly even in a bright area to be displayed brighter, it is possible to increase the contrast of the image while minimizing image distortion.

Similarly, the histogram shown in (a) of FIG. 11 may be a histogram of an image when applying the tone curve changed by brightness range extender 607. A second tone curve 1111 shown in (a) of FIG. 11 may be a tone curve changed by the brightness range extender 607.

The contrast enhancer 609 may calculate the dark area threshold value which is the threshold value of the dark area class and the bright area threshold value which is the threshold value of the bright area class, using the threshold value calculator 605.

The contrast enhancer 609 may not change the tone curve for the bright area, when the bright area threshold value is equal to the bright area reference value or is close to the bright area reference value. In contrast, the contrast enhancer 609 may change the tone curve such that the dark area threshold value becomes close to the dark area reference value, when the dark area threshold value is greater than the dark area reference value. Specifically, the contrast enhancer 609 may change the tone curve, by maintaining the output luminance with respect to the input luminance representing the bright area of the tone curve and decreasing the output luminance with respect to the input luminance representing the dark area. That is, the contrast enhancer 609 may change the tone curve from a second tone curve 1111 to a third tone curve 1112. In this case, the output luminance of the third tone curve 1112 for the bright area may be equal to that of the second tone curve 1111, and the output luminance of the third tone curve 1112 for the dark area may be greater than that of the second tone curve 1111.

The input luminance representing the dark area is a minimum luminance (e.g., 0 nits) to an intermediate luminance value (e.g., 5,000 nits) and the input luminance representing the bright area is an intermediate luminance value (e.g., 5,000 nits) to a maximum luminance value (e.g., 10,000 nits).

Therefore, by decreasing the luminance of the background, the contrast of the image is output highly.

That is, by not performing separate adjustment when the bright area is expressed with appropriate brightness and adjusting only an area which is displayed brightly even in a dark area to be displayed darker, it is possible to increase the contrast of the image while minimizing image distortion.

That is, the contrast enhancer 609 may change the tone curve such that the level of the bright area class of the histogram according to the signal level of the input image increases and the level of the dark area class of the histogram according to the signal level of the input image decreases.

In summary, in the display device 100 according to the embodiment of the present disclosure, the tone curve determiner 507 may obtain a first tone curve, the brightness range extender 607 may change the first tone curve to a second tone curve, and the contrast enhancer 609 may change the second tone curve to a third tone curve.

FIG. 12 is a view illustrating a histogram of an HDR image signal input to a display device according to an embodiment of the present disclosure and a luminance histogram of an output image.

The left graph of (a) of FIG. 12 and the left graph of (b) of FIG. 12 are histograms calculated according to the level of the input HDR image signal, and the right graph of (a) of FIG. 12 and the right graph of (b) of FIG. 12 are histograms summarizing the result of measuring the luminance when the HDR image signal is output from the display 180.

That is, according to FIG. 12, it can be seen that the center point of the image output from the display 180 moves and the brightness range is wide, compared to the input HDR image signal. Accordingly, according to the embodiment of the present disclosure, it can be seen that power of expression is abundant and contrast is enhanced.

FIG. 13 is a view illustrating an output image according to the controller shown in FIG. 5 and an output image according to the controller shown in FIG. 6.

That is, the left drawings of FIG. 13 show images output from the display 180 when the controller 170 shown in FIG. 5 processes an HDR image, and the right drawings of FIG. 13 show images output from the display 180 when the controller 170 shown in FIG. 6 processes an HDR image. That is, as shown in FIG. 13, it can be seen that, when the controller 170 further includes the tone mapping enhancer 600, the expression range of the image further extends and the image is displayed more clearly and brightly.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
    a controller configured to perform tone mapping for adjusting luminance of an input image using a tone curve; and
    a display configured to display the input image having the adjusted luminance,
    wherein the controller is further configured to separate an object and a background in the input image and adjust a luminance of at least one of the object or the background,
    wherein the controller is further configured to:
    calculate a threshold value for separating the object and the background in the input image;
    change the tone curve based on the threshold value; and
    adjust the luminance of the at least one of the object or the background by performing tone mapping using the changed tone curve,
    wherein the controller comprises:
    a brightness distribution conversion predictor configured to calculate a result of converting the input image using an electro-optical transfer function (EOTF); and
    a tone mapping result predictor configured to tone-map an image calculated by the brightness distribution conversion predictor using the tone curve.

2. The display device of claim 1, wherein the controller is further configured to increase the luminance of the object in the input image.

3. The display device of claim 1, wherein the controller is further configured to decrease the luminance of the background in the input image.

4. The display device of claim 1, wherein the controller is further configured to calculate the threshold value from the input image using an Otsu algorithm.

5. The display device of claim 1,
    wherein the controller is further configured to compare the threshold value with a center value and change the tone curve based on a result of the comparison, and
    wherein the center value is a median value of a signal level of the input image.

6. The display device of claim 5, wherein the controller is further configured to change the tone curve to decrease output luminance based on the threshold value being greater than the center value, and change the tone curve to increase the output luminance based on the threshold value being less than the center value.

7. The display device of claim 5, wherein the controller is further configured to classify the signal level of the input image as a dark area class or a bright area class, and determine whether to change output luminance of a dark area of the tone curve and whether to change output luminance of a bright area of the tone curve based on characteristics of the dark area class and characteristics of the bright area class.

8. The display device of claim 7, wherein the controller is further configured to calculate a dark area threshold value of the dark area class and a bright area threshold value of the bright area class, and determine whether to change the output luminance of the dark area of the tone curve and whether to change the output luminance of the bright area of the tone curve based on the dark area threshold value and the bright area threshold value.

9. The display device of claim 8, wherein the controller is further configured to decrease the output luminance of the dark area of the tone curve based on the dark area threshold value being greater than a dark area reference value.

10. The display device of claim 8, wherein the controller is further configured to increase the output luminance of the bright area of the tone curve based on the bright area threshold value being less than a bright area reference value.

11. The display device of claim 8, wherein the controller is further configured to decrease the output luminance of the dark area of the tone curve based on the dark area threshold value being greater than a dark area reference value, and increase the output luminance of the bright area of the tone curve based on the bright area threshold value being less than a bright area reference value.

12. The display device of claim 1, wherein the controller comprises:
    a histogram calculator configured to obtain a histogram for a signal level of the input image;
    a maximum brightness extractor configured to obtain a maximum brightness of the input image based on the histogram;
    a tone curve determiner configured to adjust the tone curve based on the maximum brightness; and
    a tone mapping performer configured to tone-map the input image using the tone curve adjusted by the tone curve determiner.

13. The display device of claim 12, wherein the controller further comprises a tone mapping enhancer configured to change the tone curve adjusted by the tone curve determiner based on characteristics of the input image, and
    wherein the tone mapping performer is further configured to tone-map the input image using the tone curve changed by the tone mapping enhancer.

14. The display device of claim 13, wherein the tone mapping enhancer comprises:
    the brightness distribution conversion predictor;
    the tone mapping result predictor;
    a threshold value calculator configured to calculate at least one threshold value from the image having a luminance adjusted by the tone mapping result predictor;
    a brightness range extender configured to change the tone curve based on the at least one threshold value; and
    a contrast enhancer configured to change the tone curve changed by the brightness range extender based on the at least one threshold value.

15. The display device of claim 14,
    wherein the tone curve determiner is further configured to obtain a first tone curve,
    wherein the brightness range extender is further configured to change the first tone curve to a second tone curve, and
    wherein the contrast enhancer is further configured to change the second tone curve to a third tone curve.

16. The display device of claim 1, wherein the controller is further configured to change the tone curve such that a brightness range of a histogram according to a signal level of the input image is widened.

17. The display device of claim 1, wherein the controller is further configured to change the tone curve to increase a level of a bright area class of a histogram according to a signal level of the input image and to decrease a level of a dark area class of the histogram according to the signal level of the input image.

* * * * *